(12) United States Patent
Leimer

(10) Patent No.: US 7,316,386 B2
(45) Date of Patent: Jan. 8, 2008

(54) VALVE STEM SEAL ASSEMBLY

(75) Inventor: Mark A. Leimer, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 97 days.

(21) Appl. No.: 11/148,621

(22) Filed: Jun. 9, 2005

(65) Prior Publication Data

US 2006/0278840 A1    Dec. 14, 2006

(51) Int. Cl.
*F01L 3/10* (2006.01)
(52) U.S. Cl. .................. 251/337; 251/214; 264/279
(58) Field of Classification Search ............ 251/214, 251/337; 123/188.6; 264/267, 279
See application file for complete search history.

(56) References Cited

U.S. PATENT DOCUMENTS

| | | | |
|---|---|---|---|
| 3,326,582 A | 6/1967 | Currie | |
| 3,788,295 A | 1/1974 | Toth | |
| 4,050,700 A * | 9/1977 | Lifferth | 277/643 |
| 4,198,062 A | 4/1980 | Grzesiak | |
| 4,501,431 A * | 2/1985 | Peisker et al. | 277/559 |
| 4,834,037 A | 5/1989 | Lafever | |
| 6,079,693 A * | 6/2000 | Ettinger et al. | 251/195 |
| 6,148,783 A | 11/2000 | Hesher et al. | |
| 6,205,969 B1 | 3/2001 | McArthy | |
| 6,270,082 B1 | 8/2001 | Hegemier | |
| 6,571,761 B1 | 6/2003 | Leimer | |
| 6,761,141 B2 | 7/2004 | Leimer | |
| 6,764,122 B2 * | 7/2004 | Kharod | 296/50 |
| 6,877,719 B2 * | 4/2005 | Heinl | 251/337 |

* cited by examiner

*Primary Examiner*—Gregory Huson
*Assistant Examiner*—John K. Fristoe, Jr.
(74) *Attorney, Agent, or Firm*—Marshall & Melhorn LLC

(57) ABSTRACT

A valve stem seal assembly having a retainer body that includes an annular interior passageway defined by a wall is disclosed. At least one internal sprue extends between top and bottom ends of the retainer body and are formed within the wall. A channel is concentrically formed about the interior passageway on the bottom surface of the retainer body and is in fluid communication with the internal sprue. A sealing material inserted to the sprue extends from the top end of the retainer body through the internal sprue and into the channel such that a single seal body is formed.

9 Claims, 3 Drawing Sheets

VALVE STEM SEAL ASSEMBLY

TECHNICAL FIELD

The present invention relates generally to valve stem seal assemblies, and in particular to a seal for a valve stem seal assembly for use with valve internal combustion engines.

BACKGROUND

Those skilled in the art will appreciate the manner in which intake and exhaust valves are employed in cylinder heads of internal combustion engines. In conventional overhead valve internal combustion engines, a pair of valves reciprocates in timed alternation to provide intermittent communication between the intake and exhaust manifolds and a combustion chamber. As is well known, the intake port of a combustion chamber is opened and closed by the reciprocating motion of at least one intake valve. The intake valve permits fuel mixed with air to flow into the combustion chamber. In addition, an internal combustion engine has at least one exhaust valve and associated exhaust port for releasing expended combustion gases into the atmosphere. Lubrication is provided to the upper portions of the valves. Because temperatures in the combustion chamber may approach or exceed 1000 degrees Centigrade, any lubricating oil exposed to these temperatures will vaporize or burn leaving behind deposits that may interfere with the proper sealing of the valves and cause rapid deterioration. Valve stem seal assemblies are used to seal against leakage of oil between each valve guide and its associated valve stem.

It is therefore necessary to provide seals around the upper region of the valve stems and along the valve guide down to the manifolds and combustion chamber. A typical valve stem seal has a generally cylindrical shape that is partially closed at one end by the valve seal. The cylindrical region seats about the valve guide to maintain the valve seal in a stationary position. An upper region of the valve stem is surrounded by the valve seal when the valve stem is fully inserted into the valve seal assembly.

Conventional valve seal assemblies include individual body and seal components that typically must be assembled into the valve seal assembly. Use of multiple components and the associated assembly labor increases the cost of the valve seal assembly.

In some engines, unitary elastomeric valve stem seals are fitted over or atop each valve guide, wherein the seal component is frictionally mounted directly to the guide. However, traditional manufacture of such seals has been only on a unitary batch basis, or via one batch at a time. Thus, although much progress has been achieved in the art of valve stem design and construction, cost-effective techniques for enhancement of strength of materials, along with streamlined manufacturing techniques remain areas in need of additional improvement.

SUMMARY

An embodiment of a valve stem seal assembly is disclosed that includes a retainer body having an annular interior passageway defined by a wall, and at least one internal sprue extending between top and bottom ends of the retainer body and formed within the wall. One or more channels are concentrically formed about the interior passageway on a bottom surface of the retainer and are in fluid communication with the internal sprue.

A predetermined mount of a sealing material is inserted into the internal sprue until the sealing material extends from the top end of the retainer body through the at least one internal sprue and into the channel such that a single seal body is formed.

In another embodiment of the invention, a valve stem seal assembly includes a flange that is connected to the retainer body. One or more channels are formed concentrically about the interior passageway on a bottom surface of the flange. A method for manufacturing a valve stem seal assembly is also disclosed.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION

Figure 1:
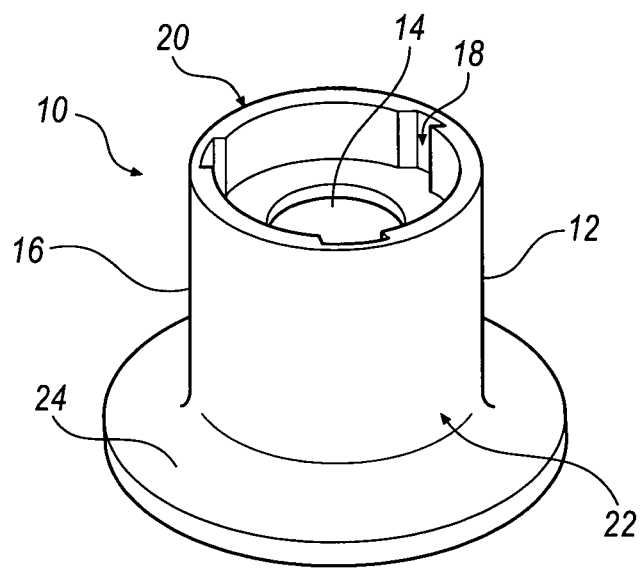
FIG. 1 is a perspective view of a valve stem seal assembly with at least one internal sprue according to an embodiment of the invention.
Figure 2:
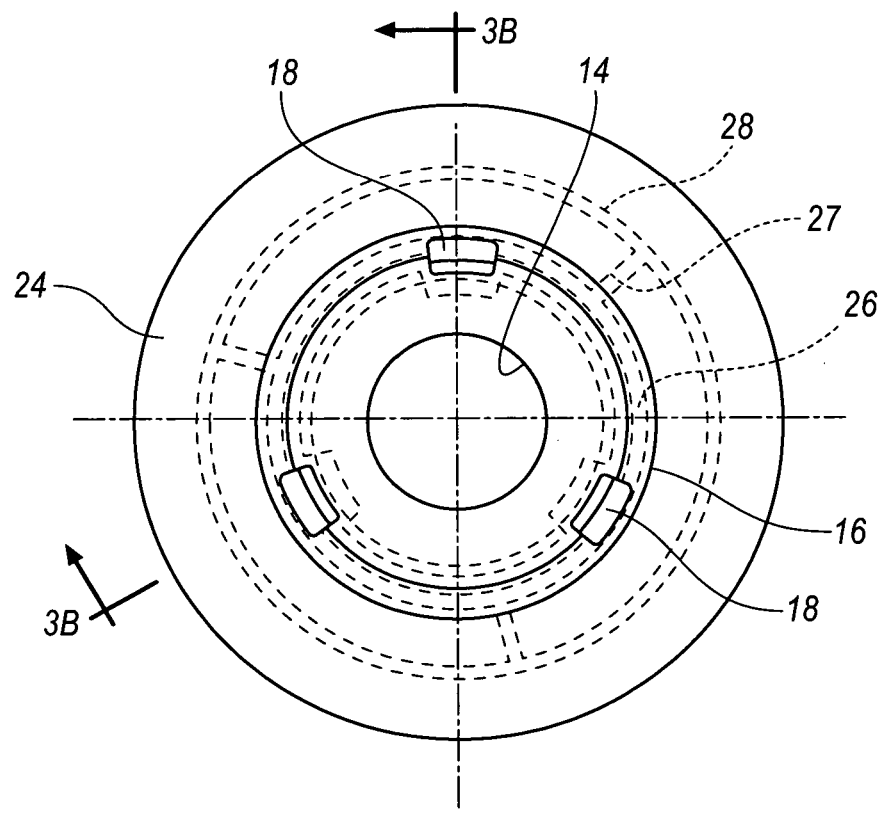
FIG. 2 is a top view of the valve stem assembly of FIG. 1.

Referring to FIGS. 1 and 2, a valve stem seal assembly 10 is shown. In use, the valve stem seal assembly 10 is mounted and secured in position upon a valve guide of an internal combustion engine (not shown.)

The valve stem seal assembly 10 includes a retainer body 12 having an annular interior passageway 14 defined by a wall 16. The retainer body 12 has at least one internal sprue 18 extending between top 20 and bottom 22 ends thereof. The sprue 18 is formed within the wall 16 of the retainer body 12.

The retainer body 12 may also include an integral flange 24 that extends radially outward from the bottom end 22 thereof. At least one channel 26 is concentrically formed about said interior passageway 14. The channel 26 may be formed on a bottom surface 25 of the retainer body 12 (See FIG. 4A). Alternatively, the channel 26 may be formed on the bottom surface 25 of the flange 24. Further, as shown in FIG. 2, in one embodiment of the valve stem seal assembly 10, at least two channels (26, 28) are formed on the bottom surface 25 of the flange 24 and/or the retainer body 12 or a combination of both. Further, it is appreciated that three or more channels may be formed on the flange 24 without exceeding the scope of the invention. If more than one channel 26 is formed on the flange 24 as illustrated in FIG. 2, at least one radially extending connecting channel 27 extends between adjacent channels 26, 28 to place the concentric channels is fluid communication with one another (See also FIG. 4A).

Figure 3A:
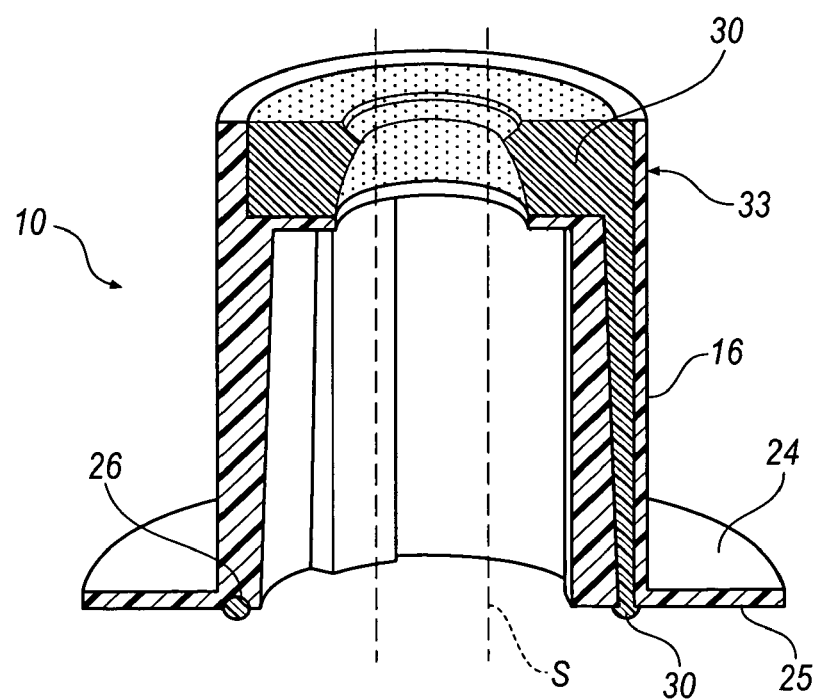
FIGS. 3A and 3B are alternative cross-sectional views of the valve stem assembly of FIG. 1.
Figure 3B:
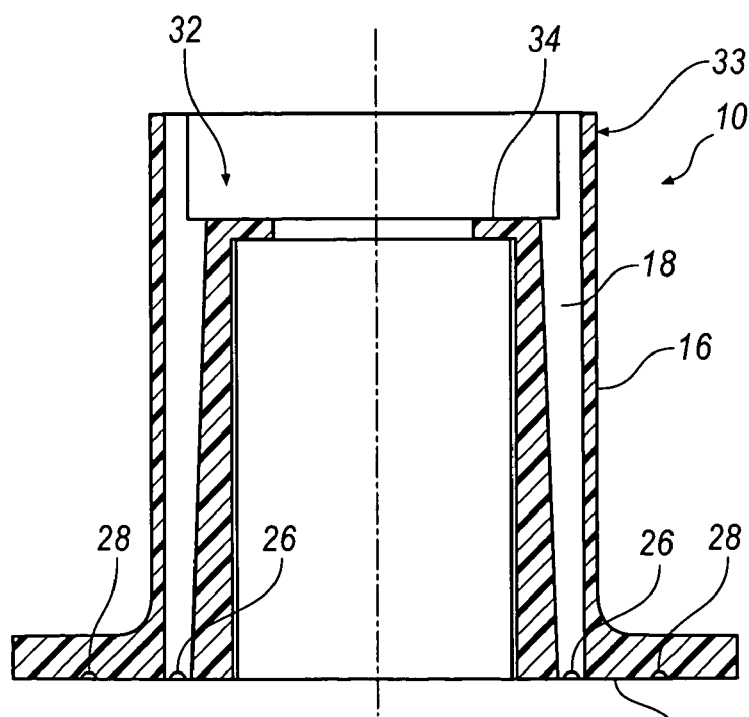

Referring now to FIGS. 3A and 3B, in one embodiment, a recess 32 is defined by a top portion 33 of the wall 16 and a seat 34 that extends radially inward from the wall 16. The recess 32, the internal sprue(s) 18 and the channel(s) 26, 28 are filled with a sealing material 30. Preferably, the sealing material is an elastomeric material or other rubber like material. In those embodiments that do not contain a recess, the sealing material 30 is inserted directly into sprue(s) 18.

In one embodiment, a plug (not shown) is inserted into the top end of the interior passageway 14. Next, sealing material 30 is poured into a recess 32 formed at the top end 20 of the retainer body 12 until the channel(s) 26, 28, the internal sprue(s) 18 and the recess 32 are filled. The plug serves to restrict the sealing material 30 to the recess 32, internal sprue(s), and channel(s) 26, 28. After the sealing material 30 has been poured it is allowed to cure such that a single, unitary seal body 30 is formed that extends from the top end 20 of retainer 12 through the sprue(s) 18 and into the channel(s) 26.

Referring to FIGS. 2 and 3B, it is shown that the recess 32, the internal sprue(s) 18 and the channel(s) (26, 28) are in fluid communication with one another to permit these voids to be filled with sealing material 30 that is poured in to the recess 32.

Figure 4A:
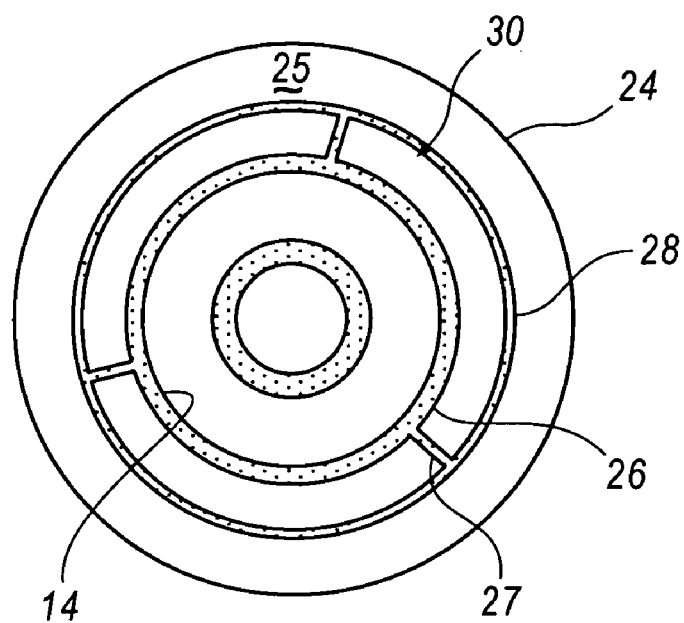
FIG. 4A is a bottom view of the valve stem assembly of FIG. 3A.

FIG. 4A, illustrates a bottom view of the valve stem seal assembly 10 wherein the two channels (26, 28) formed on a bottom surface 25 of the flange 24 and connecting channels 27 are filled with sealing material 30. Increasing the number of channels on the bottom surface 25 of the flange 24 will effectively increase the sealing capability of the valve stem seal assembly 10.

Figure 4B:
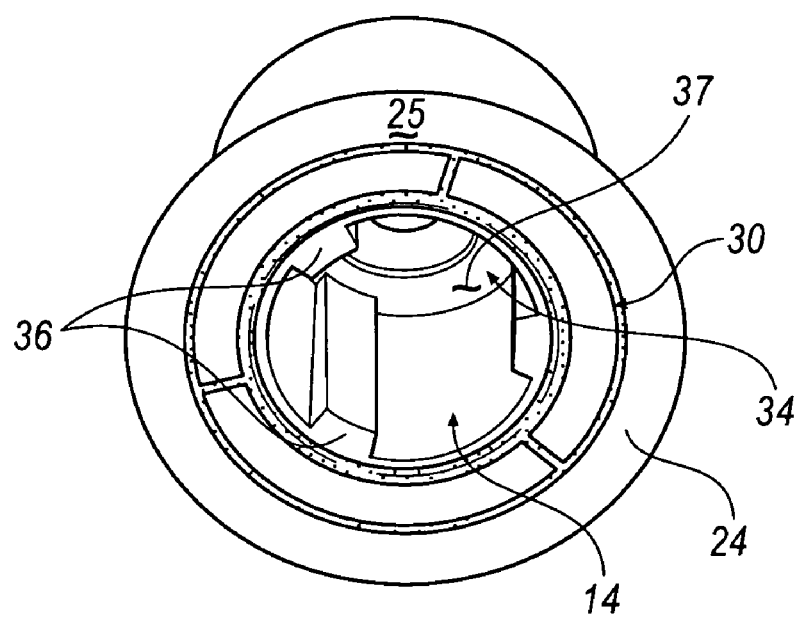
FIG. 4B is a perspective view of an annular interior passageway of the valve stem assembly of FIG. 3A.

FIG. 4B illustrates a view of the interior passageway 14 wherein at least one pad 36 is formed on the interior surface of the wall 16. The pad 36 extends between the top 20 and bottom 22 ends of the retainer body 12. In the embodiment that includes the recess 32, the pads 36 extend between a bottom surface 37 of the seat 34 and the bottom end 22. In the illustrated embodiment, the three pads 36 are symmetrically positioned at 60-degree intervals along the circumference of the interior passageway 14. While the pads 36 are shown having a substantially uniform shape and width, it is understood that the pads 36 can have a non-uniform shapes and can be non-rectangular in cross-section along their length. Nor must the pads 36 be symmetrically arranged along the circumference of the interior passageway 14.

The invention valve stem seal assembly 10 may include any desired number of internal sprues 18 and pads 36 and may be positioned at any desired non-symmetric interval about and along the circumference of the interior passageway 14. The retainer body 12 may be formed from any suitable plastic material having high temperature strength and stability such as a polyester elastomeric material or similar plastics. In one embodiment, the retainer 12 is preferably formed from Nylon 4-6 material.

As best illustrated in FIG. 3A, the sealing material 30 frictionally and circumferentially contacts the valve stem S. However, in other embodiments, depending on the operating conditions, a seal container (not shown) may be employed to urge the sealing material 30 into contact with the valve stem S.

During the manufacturing of the valve seal assembly 10, the flange 24 of the retainer body 12 is placed on top of a tool plate that contains a circumferential groove on the surface of the plate. The retainer body 12 is positioned to properly receive a sealing material 30. The sealing material 30 is inserted into the retainer body 12 in any suitable manner such that the sealing material 30 fills the channel(s) 26, 28, the internal sprue(s) 18 and the recess 32 (if provided) formed on the top end 20 of the retainer body 12. The sealing material is thereafter allowed to cure whereby a single, unitary seal body 30 is formed that extends from the top end 20 of the retainer body 12 through the internal sprue 18 and into the channel 26.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A valve stem steal assembly, comprising:
 a retainer body having an annular interior passageway, said passageway and at least one internal sprue extending between top and bottom ends of said retainer body;
 two channels concentrically formed about said interior passageway on a bottom surface of said retainer body, said channels being in fluid communication with at least one internal sprue;
 a sealing material extending from said top end through said at least one internal sprue and into said channel; and
 an annular seat only partially extending into said interior passageway, wherein said at least one sprue extends through and is open to said annular seat.

2. The seal assembly of claim 1, including a flange that extends radially outward from said bottom end of said retainer body.

3. The seal assembly of claim 1, further comprising a recess formed at said top end of said retainer body, said recess defined by a portion of said wall and said seat extending radially inward from said wall.

4. The seal assembly of claim 1 wherein said sealing material is flouroelastomeric.

5. The seal assembly of claim 1 wherein said retainer body is formed of plastic.

6. The seal assembly of claim 1 wherein said retainer body is formed of Nylon 4-6 material.

7. A valve stem seal assembly, comprising:
 a retainer body having an annular interior passageway, at least two internal sprues extending between top and bottom ends of said retainer body;
 a flange extending radially outward from said bottom end;
 at least two channels concentrically formed about said interior passageway, wherein at least one of said channels is formed on a bottom surface of said flange, said at least two channels being in fluid communication with said at least two internal sprues;
 a sealing material extending from said top end through said at least two internal sprues and into said at least two channels; and
 an annular seat only partially extending into said interior passageway, wherein said at least two sprues extend through and open to said annular seat.

8. The seal assembly of claim 7, further comprising at least one connecting channel extending between adjacent concentric channels.

9. The seal assembly of claim 7 further comprising a recess formed at said top end of said retainer body, said recess defined by said wall and said seat extending radially inward from said wall.

* * * * *

UNITED STATES PATENT AND TRADEMARK OFFICE
CERTIFICATE OF CORRECTION

PATENT NO. : 7,316,386 B2  Page 1 of 1
APPLICATION NO. : 11/148621
DATED : January 8, 2008
INVENTOR(S) : Mark A. Leimer It is certified that error appears in the above-identified patent and that said Letters Patent is hereby corrected as shown below:

Col. 4, Line 12
Claim 1, line 12, replace "steal" with --seal--.

Signed and Sealed this

Sixth Day of May, 2008

JON W. DUDAS
*Director of the United States Patent and Trademark Office*